United States Patent Office 3,755,562
Patented Aug. 28, 1973

3,755,562
PARAFFINIC BASE OIL CARRIER COMPOSITIONS
FOR PESTICIDES
Frederic C. McCoy, Beacon, N.Y., assignor to
Texaco Inc., New York, N.Y.
No Drawing. Filed June 24, 1968, Ser. No. 739,181
The portion of the term of the patent subsequent
to Dec. 1, 1987, has been disclaimed
Int. Cl. A01n 9/20, 13/00
U.S. Cl. 424—78                               15 Claims

ABSTRACT OF THE DISCLOSURE

A pesticidal dispersion comprising (1) a paraffinic hydrocarbon oil having an unsulfonatable content of at least about 90 wt. percent, (2) an oil soluble aluminum, iron, nickel, alkali metal, alkaline earth metal or alkylamine salt of a carboxylic or dihydrocarbyl orthophosphoric acid (3) an ashless dispersant for lubricating oils selected from (a) alkylene oxide derivative of an organic phosphorus acid, (b) alkyl methacrylate-vinyl pyrrolidinone copolymer, or (c) an alkoxylated piperazine derivative of alkenyl succinic anhydride and (4) a finely divided, oil insoluble pesticidal compound dispersed throughout, said composition optionally including a supplementary suspending agent.

BACKGROUND OF THE INVENTION

Field of the invention

This invention pertains to the area of art relating to pesticidal dispersions in oil comprising an oil base containing finely divided pesticidals solids and a specific combination of ashless lube oil dispersant, sediment resisting organic metal salt or amine salt, and alternatively including a supplementary suspending agent.

Description of prior art

In the past, solid pesticides in order to facilitates their distribution over relatively large geographical areas were incorporated as finely divided particles in liquid carriers such as mineral oils. Although this provided a means of distribution, one of the continuous problems in these dispersions was to produce a dispersion which is fluid enough to be easily sprayed or applied, e.g., of a Brookfield viscosity at 77° F. of less than about 2000 centipoises (cps.), be concentrated enough, e.g., between about 30 and 60 wt. percent solid pesticide, to insure the minimal amount of storage and handling requirements for the maximum amount of potency and yet be resistant to the sedimentation of the solid pesticide upon storage or transport. Sedimentation of the pesticide is highly undesirable in that even vigorous stirring will often not place it back in suspension. Further, even with stirring much of the pesticide sediment is lost for use in that a substantial portion remains as an agglomerated mass at the bottom of the container.

SUMMARY OF INVENTION

I have discovered, and this constitutes my invention, a pesticidal formulation comprising a paraffinic oil composition having a highly concentrated amount of finely divided, oil-insoluble solid pesticide dispersed therein which is readily sprayable and yet resistant to sedimentation under quiescent (storage) or vibrational (transport) conditions, said sprayability and resistance resulting from the synergistic-like interaction with the pesticide of a particular combination of metal or amine salt, ashless lubricating oil dispersant and paraffinic oil. More particularly, my invention pertains to a pesticidal composition consisting essentially of a paraffinic base oil having an unsulfonatable content of at least about 90 wt. percent containing (1) a dispersed, finely divided, oil-insoluble, solid pesticide, (2) an oil soluble aluminum, iron, nickel, alkali metal, alkaline earth metal or alkylamine salt of alkanoic acid, dialkyl orthophosphoric acid or alkylalkenyl orthophosphoric acid and (3) an oil soluble, ashless lubricating lube oil dispersant selected from (a) an alkylene oxide derivative of an organic phosphorus acid, (b) alkyl methacrylate-N-vinyl-2-pyrrolidinone copolymer or (c) alkoxylated aminoalkyl piperazine derivative of alkenyl succinic anhydride. Optionally, there may be included additional supplementary solid particle suspending agents.

DETAILED DESCRIPTION OF THE INVENTION

Specifically, the pesticidal composition contemplated herein comprises a paraffinic hydrocarbon oil of a kinematic viscosity between about 1.5 and 70 centistokes (cs.) at 100° F. and an unsulfonatable content of at least about 90 wt. percent containing between about (1) 30 and 60 wt. percent of a finely divided hydrocarbon oil insoluble solid pesticide, (2) 0.04 and 1.4 wt. percent of an oil soluble salt of the formula $M(Z)_y$ where M is a first member selected from the group consisting of an ion of aluminum, nickel, iron, alkali metal, alkaline earth metal and alkyl ammonium of from 3 to 20 carbons, y is an integer representing the valence of said first member, Z is a monovalent radical selected from the group consisting of the formula:

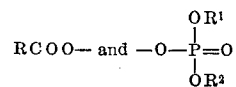

where R is alkyl of from 5 to 12 carbons, $R^1$ is alkyl of from 1 to 3 carbons and $R^2$ is a second member selected from the group consisting of alkyl and alkenyl of from 10 to 22 carbons and (3) between about 0.04 and 3.5 wt. percent of an oil soluble ashless dispersant selected from the group consisting of:

(a) an alkoxylated derivative of inorganic phosphorus acid free, steam hydrolyzed aliphatic polyolefin (250-50,000 M.W.)-$P_2S_5$ reaction product wherein the alkoxy group contains from 2 to 10 carbons, (b) a copolymer of N-vinyl-2-pyrrolidinone and alkyl methacrylate of a molecular weight between about 100,000 and 2,000,000 consisting of between about 4 and 15 wt. percent N-vinyl-2-pyrrolidinone and between about 85 and 96 wt. percent of alkyl methacrylate, said alkyl containing from 4 to 18 carbons, (c) and a condensation product of trialkoxylated N-aminoalkyl piperazine and alkenyl succinic anhydride of a molecular weight between about 2,000 and 5,000 wherein said alkoxy is of from 2 to 10 carbons, said alkyl is from 1 to 5 carbons and said alkenyl is from 50 to 200 carbons derived from an alkene of from 2 to 10 carbons.

Under preferred circumstances, the paraffinic oil has a kinematic viscosity of between about 4 and 30 cs. at 100° F., a sediment resisting salt content of between about 0.2 and 0.4 wt. percent, an ashless dispersant content of between 0.1 and 1.1 wt. percent and a pesticidal content of between about 40 and 55 wt. percent. Under most preferred circumstances, the solid pesticide is 1-naphthyl-N-methylcarbamate, also known as Carbaryl and sold by Union Carbide Corp. under the tradename Sevin; the salt is aluminum tri(ethyloleyl orthophosphate) or aluminum trioctaneoate; and the ashless dispersant is the ethylene oxide derivative of an inorganic phosphorus acid-free, steam-hydrolyzed polybutene(1100 M.W.)-$P_2S_5$ reaction product wherein the ethylene oxide component and reaction product component are respectively present in said derivative in a mole ratio of approximately 1:1. Further description of the ethylene oxide derivative is found in U.S. 3,087,956.

In addition to the oil base, metal salt, ashless dispersant, pesticide components of the compositions of the invention, there is also in the preferred compositions of the invention between about 0.1 and 3.0 wt. percent, preferably between 0.5 and 1.5 wt. percent of a supplementary suspending agent for solid particles such as finely divided (e.g. 100–400 A.) particles of pyrogenic silica and a solvent dispersed mixture of ester and modified hydrocarbon wax polymer, said polymer having a melting point of between about 200 and 230° F., said mixture being of grease like consistency. One suitable pyrogenic silica is sold under the tradename Cab-O-Sil by the Cabot Corporation. The additional suspending agent is principally used when the compositions of the invention are subjected to extended periods of severe vibration such as long-haul transport via railroad. It appears that the vibrational forces continuously agitate the suspended particles and partially negate the suspending effect of the sediment resisting salt-ashless dispersant combination.

The composition is advantageously prepared by first introducing the sediment resisting salt and the ashless dispersant into the paraffinic base oil, preferably under conditions of agitation, e.g., stirring, and preferably under elevated temperature conditions, e.g., between about 220 and 300° F. until the dispersant and salt are dissolved therein. When the paraffinic oil is in actually a composite of two or more components of varying viscosity, the salt and ashless dispersant are desirably blended first into the fraction of the lowest viscosity, and then the resultant mixture in turn is blended with the higher viscosity fraction or fractions. Further, even when a one component oil is employed, the salt and dispersant additives may be combined into only a portion of the paraffinic oil to form a concentrate and the concentrate subsequently diluted with additional paraffinic oil. As a next step, the finely divided, oil-insoluble, solid pesticide and the supplementary suspending agent (if employed) are then added, preferably incrementally, normally over a period of between about 0.5 and 2 hours, and under conditions of high agitation, to the base oil composition at a temperature between about 80 and 120° F. until complete dispersion of the pesticide is obtained.

As heretofore stated, the oil component of the composition is essentially a paraffinic hydrocarbon having less than about 10 wt. percent, preferably less than about 5 wt. percent, of an aromatic naphthenic and/or unsaturated aliphatic content, that is, less than 10 wt. percent and preferably less than 5 wt. percent sulfonatable residue. Further, the paraffinic base oil contemplated herein preferably have a boiling range between about 320 and 870° F. and most preferably a kinematic viscosity at 100° F. of between about 4 and 16 cs.

Specific representatives of suitable paraffinic hydrocarbon oil fractions that can be employed in preparing the compositions of the present invention are as follows:

(1) A refined fraction from a paraffinic base crude oil having a flash point of 270° F., a kinematic viscosity of 45 cs. at 100° F., a boiling range of 508 to 650° F. and an unsulfonatable residue of 95 wt. percent.

(2) A blend of a wax distillate fraction from a refined paraffinic base crude together with a residue fraction from a paraffinic base crude, the blend having a flash point at 355° F., a kinematic viscosity at 100° F. of 17.5 cs., a boiling range of 617 to 853° F. and an unsulfonatable residue of 90 wt. percent.

(3) A blend similar to the previous oil having a flash point of 355° F., a kinematic viscosity at 100° F. of 15 cs., a boiling range of 630 to 752° F. and an unsulfonatable residue of 93 wt. percent.

(4) A paraffinic alkylate bottoms removed as residue in the manufacture of aviation gasoline via the reaction of isobutane and butylene in a sulfuric acid catalyst system having an initial boiling point of 318° F. and an end boiling point of 512° F., a 50% boiling point of 362° F. and a kinematic viscosity of 1.6 cs. and an unsulfonatable content of 95 wt. percent.

The employment of a paraffinic oil having an unsulfonatable content of at least 90 wt. percent is critical in that when sulfonatable contents substantially exceeds about 10 wt. percent the viscosity of the compositions of the invention are so high as to not render them readily dispersible. A ready explanation of why this occurs is not apparent. Furthermore, for agricultural use an unsulfonatable content of at least about 90 wt. percent is desirable to avoid damage to plants.

Examples of the sediment resisting salts contemplated herein are: aluminum trihexanoate, aluminum trioctanoate, aluminum tridodecanoate, aluminum tri(ethyloleyl-o-phosphate), aluminum tri(ethyllauryl-o-phosphate), ferric trioctanoate, ferric tri(methylpentadecyl-o-phosphate), nickel dinonoate, nickel di(propyltridecenyl-o-phosphate), sodium undecanoate, sodium ethyleicosanyl-o-phosphate, potassium octanoate, potassium methylpentadecyl-o-phosphate, calcium diheptanoate, calcium di(propyltradecenyl-o-phosphate), magnesium didodecanoate, magnesium di(ethyltridecyl-o-phosphate), n-butylammonium octanoate, n-butylammonium ethyloleyl-o-phosphate and a mixture of $t\text{-}C_{12}H_{25}NH_3^+$, $t\text{-}C_{13}H_2NH_3^+$, $t\text{-}C_{14}H_{29}NH_3^+$ and $t\text{-}C_{15}H_{31}NH_3^+$ ethyloleyl-o-phosphates.

Hereinbefore and hereinafter the term "ashless dispersant" is intended to denote organic dispersants which contain essentially no metal. Subsequent hereto are listed specific examples of the three classes of ashless dispersants contemplated herein.

Specific examples of the alkoxylated inorganic phosphorus acid-free, steam-hydrolyzed aliphatic polyalkene (M.W. 250–50,000)-phosphorus pentasulfide reaction product are the ethylene oxide derivative of inorganic phosphorus acid-free, steam hydrolyzed polybutene(1100 M.W.)-$P_2S_5$ reaction product in which the ethylene oxide component and reaction product component are present in a mole ratio of about 1:1, the 2,3-butylene oxide derivative of inorganic phosphorus acid-free, steam-hydrolyzed polypropylene(6000 M.W.)-$P_2S_5$ reaction product in which the 2,3-butylene oxide component and reaction product is present in said derivative in a mole ratio of about 1:1, and a 4-methyl-2,3-octylene oxide derivative of inorganic phosphorus acid-free, steam-hydrolyzed polyethylene(30,000 M.W.)-$P_2S_5$ reaction product where the mole ratio of said oxide to said product in said derivative is about 1:1. The polyalkene forming the reaction product is normally derived from an alkene of from 2 to 10 carbons and where the alkylene oxide employed to form the derivative advantageously has between 2 and 10 carbons. The deriavtives contemplated herein are further described in U.S. 3,087,956. It is described therein the polyalkene-$P_2S_5$ reaction product is prepared by reacting about 5 to about 40 percent $P_2S_5$ with polyalkene at a temperature between about 100 and 320° C. in a non-oxidizing atmosphere.

Specific examples of the copolymer of N-vinyl-2-pyrrolidinone and alkyl methacrylates in the molecular weight range of 100,000 to 2,000,000 are copolymers comprising 6 to 10 wt. percent N-vinyl-2-pyrrolidinone, 25 to 35 wt. percent stearyl methacrylate, 15 to 55 wt. percent lauryl methacrylate and 10 to 14% butyl methacrylate. A particularly preferred copolymer comprises about 8 wt. percent N-vinyl-2-pyrrolidinone, 30 wt. percent stearyl methacrylate, 50 wt. percent lauryl methacrylate and 12 wt. percent butyl methacrylate of about 550,000 M.W. Other examples are a copolymer comprising about 12 wt. percent N-vinyl-2-pyrrolidinone and 88 wt. percent dodecyl methacrylate of a molecular weight of about 300,000, a copolymer of about 10 wt. percent N-vinyl-2- pyrrolidinone, 70 wt. percent octyl methacrylate and 20 wt. percent octadecyl methacrylate of a molecular weight of about 1,800,000, and a copolymer comprising about 4 wt. percent N-vinyl-2-pyrrolidinone, 40 wt. percent isopentyl methacrylate and 56 wt. percent myristyl methacrylate of a molecular weight of about 1,000,000. These copolymers are further described in U.S. 3,131,119.

As heretofore stated, the dispersions of the invention suitably contains any finely divided, hydrocarbon oil-insoluble, solid pesticide desirably of a particle size less than about 200 mesh (U.S. Standard), i.e., will pass a 200 mesh sieve (U.S. Standard) in an amount of 100%. More preferably, the particle size is less than 300 mesh. Specific examples of suitable pesticides are copper hydroxide, copper oxide, tribasic copper sulfate, copper arsenite, copper oxychloride sulfate, calcium arsenate, lead arsenate, sodium fluoride, sulfur, and mixtures thereof as well as organic compounds such as manganese ethylene bis(dithiocarbamate), 1-naphthyl-N-methylcarbamate, 3-[2-(3,5-dimethyl-2-oxychlorohexyl)-2-hydroxyethyl]glutarimide, sodium, zinc, and iron alkyldithiocarbamate, tetramethyl thorium disulfide, sulfamic acid and N-tri-chloromethyl-mercapto-4-cyclo-1,2-dicarboximide and mixtures thereof as well as mixtures of such inorganic and organic compounds. As heretofore stated, the pesticidal material is present in the dispersions of the invention in amounts between about 30 and 60 wt. percent, preferably between about 40 and 55 wt. percent. When the compositions of the invention are to be applied via spraying, e.g., from aircraft or ground equipment, it has been found that some of the compositions of the present invention are more efficiently employed when diluted with from 1 to 10 parts of n-paraffinic hydrocarbon fractions, when using about a 50 wt. percent concentration of active pesticide component in the concentrate composition. In aerial spraying operations the diluted compositions can be applied at a rate of from about 2 to about 5 gallons per acre although application rates from about 0.5 to up to about 8 to 10 gallons per acre can be used with satisfactory results.

In respect to the compositions of the invention, one of the more surprising aspects thereof is the ashless dispersant therein not only functions as an oil-insoluble particle dispersant but unexpectedly also functions to substantially reduce the composition's viscosity to a point which will render it fluid enough for ready application by standard means such as spraying without requiring the use of excessive pressures, e.g., in substantial excess of 100 p.s.i. A ready explanation of why the dispersant in the combination of the invention functions to reduce viscosity does not present itself. Still further, I have discovered if an attempt is made to reduce the composition's viscosity by reducing the sediment resisting salt content substantially below the previously mentioned concentration ranges, the resultant composition will not provide the desired combination of suitable viscosity and satisfactory resistance to sedimentation of pesticidal particles incorporated therein. Still further, if the salt is used in sedimentation-resistant quantities alone, the viscosity of the resultant composition may become so high, e.g., 10,000 to 100,000 cps. (Brookfield) at 77° F. as to render it unsuitable for spraying. This is true even though minimal sedimentation-resistant quantities are employed. Still further, if the sediment resisting salt is eliminated the resultant composition ceases to have the desired combination of sedimentation resistant properties and viscosity stability. In other words, the particular combination of ingredients and quantities in the compositions of the invention are unexpectedly essential in rendering said compositions fluid enough to permit its ready application and yet sufficiently resistant to sedimentation so as to prevent the forming of dense pesticidal sediment at the bottom of the storage and/or transport container.

The following examples further illustrate the invention but are not to be construed as limitations thereof.

EXAMPLE I

This example illustrates the dispersion of the invention and its preparation.

To a 500-gallon stainless steel reactor fitted with a flat blade turbine type impeller and recycle centrifugal pump system, there was charged 1450 lbs. of a residuum (Oil A) of a product resulting from the sulfuric acid alkylation of isobutane with isobutene having an initial boiling point of about 318° F. and an end boiling point of about 512° F., a 50% boiling point of about 362° F. and a kinematic viscosity at 100° F. of about 1.5 cs. and an unsulfonatable content of 95 wt. percent. In addition, there was charged 13 lbs. of aluminum tri(ethyloleyl phosphate) designated ALEOP and 43 lbs. of an oil solution of an ethylene oxide derivative of inorganic phosphorus acid free, steam hydrolyzed polybutene (1100 M.W.)-$P_2S_5$ reaction product wherein the ethylene oxide and reaction product components are present in the derivative in a mole ratio of about 1:1 designated as "Ethoxylated Hydrolyzed HC-$P_2S_5$" and wherein said solution has a phosphorus content of 1.0 wt. percent, a sulfur content of 0.7 wt. percent and a hydroxyl number of 18. The impeller and centrifuge pump were activated and the stirred, circulated reactor contents were heated to a temperature of about 300° F. Stirring was continued for 4 hours and until the aluminum salt went into solution. There was then charged to the stirred heated mixture 1450 lbs. of paraffinic lubricating oil (Oil B) having a kinematic viscosity at 100° F. of 17 cs. and an initial boiling point of 623° F., an end boiling point of about 775° F., an aniline point of 210° F. and an unsulfonatable residue of 94.0 wt. percent. The blend was then cooled to 100° F. All but 850 lbs. of the blend were then withdrawn from the reactor and 880 lbs. of 1-naphthyl-N-methylcarbamate (Sevin) of a particule size less than 200 mesh (U. S. Standard) and 3.5 lbs. additional "Ethoxylated Hydrolyzed HC-$P_2S_5$" were added slowly with continued stirring over a period of 8 hours. It is to be noted that during the addition of Sevin it is required that the temperature be maintained below about 150° F., as Sevin becomes appreciably oil-soluble at temperatures much above 150° F. and upon cooling it recrystallizes in a form which increases viscosity of the dispersion to an undesirable level. The resultant composition gave the following analysis as set forth below in Table I:

Table I

| Ingredients: | Weight percent |
| --- | --- |
| Oil A | 24.05 |
| Oil B | 24.05 |
| ALEOP | 0.22 |
| Ethoxylated Hydrolyzed HC-$P_2S_5$ | 0.92 |
| Sevin | 50.76 |
| Brookfield viscosity at 77° F. cps. | 600 |

EXAMPLE II

This example further illustrates dispersions of the invention, comparative dispersions and methods of preparation.

Two blending procedures were employed in the preparation of the base oil composition (minus pesticide and supplementary suspending agent) as follows.

(XX) To a one liter 3-necked flask equipped with stirrer and condenser there was charged aforedescribed Oils A and B (Ex. I), sediment resisting salt and ashless detergent. Stirring was initiated and continued at 200 r.p.m. for a 3 hour period during which time the stirred mixture was heated to and maintained at 300° F.

(YY) Ashless dispersant was dissolved in Oil A (Ex. I) and sediment resistant salt was added thereto. The ingredients were heated to 120° C. in a stirred 3-necked flask for 5 hours. The concentrate was blended (stirring) at ambient temperature with additional quantities of Oil A and Oil B (Ex. I).

The composition of the invention and comparative compositions were then prepared by stirring 100 grams of each of the base oil compositions prepared by one of the above procedures and 100 grams Sevin insecticide. The stirring was conducted at about 10,000 r.p.m. in a laboratory blender. The viscosities were measured with a Brookfield RVF Viscometer using the No. 2 spindle at 20 r.p.m. except where a smaller spindle or a slower speed were required because of a viscosity above 2000 c.p.s. The storage tests were run by allowing a 200 gram sample of dispersion to stand in a stoppered 8 oz. bottle at room temperature with periodic probing to detect the formation of any dense, pasty sediment which would be difficult to redisperse.

Runs were conducted employing sediment resisting salts of aluminum tri(ethyloleyl orthophosphate) designated as ALEOP, aluminum tri(ethyllauryl orthophosphate) designated as ALELP, aluminum trioctanoate, ferric tri(ethyloleyl orthophosphate) designated as FeEOP, calcium di(ethyloleyl orthophosphate) designated as CaEOP, sodium ethyloleyl orthophosphate designated as NaEOP, nickel dioctanoate, n-butylammonium ethyloleyl orthophosphate designated as "Butylamine-EOP" and a mixture of $t\text{-}C_{12}H_{25}NH_3^+$, $t\text{-}C_{13}H_{27}NH_3^+$, $$t\text{-}C_{14}H_{29}NH_3^+$$

and $t\text{-}C_{15}H_{31}NH_3^+$ ethyloleyl orthophosphates designated as "Primene 81R–EOP". Further, runs were made employing as representative of the ashless dispersant (1) the ethylene oxide derivative of an inorganic phosphorus acid-free, steam-hydrolyzed polybutene (1100 M.W.)-$P_2S_5$ reaction product where the mole ratio of ethylene oxide to reaction product in said derivatives is about 1:1 designated as "Ethox. HC-$P_2S_5$," (2) a condensation product poybutene (1100 M.W.) succinic anhydride and a tripropoxylated N-aminoethyl piperazine in which the mole ratio of the anhydride to triol is 3:2 designated as "Succinic-Piperazine Product." (3) propoxylated derivative of inorganic acid-free, steam-hydrolyzed polybutene (1100 M.W.)-$P_2S_5$ reaction product wherein the mole ratio of propylene oxide to said reaction product in said derivative is about 1:1 designated as "Propox. HC-$P_2S_5$" and (4) a copolymer of a molecular weight of about 550,000, said copolymer formed from about 8 wt. percent N-vinyl-2-pyrrolidinone, 30 wt. percent stearyl methacrylate, 50 wt. percent lauryl methacrylate and 12 wt. percent butyl methacrylate designated as "Acrylic Polymer."

For comparative purposes base oil compositions were formulated outside the scope of the invention wherein aluminum trioleate, aluminum tristearate, aluminum tripalmitate, ammonium ethyloleyl orthophosphate, and cupric naphthenate were employed as the sediment resisting salts. Further, (1) lecithin, (2) polybutene(1100 M.W.) succinamic acid of tetraethylenepentamine prepared from the equvalent reaction of polybutene(1100 M.W.) succinamic acid and a tetraethylenepentamine (designated as Pentamine Prod.), and 3 a trimethylolpropane esterified derivative of an inorganic phosphorus acid free, steam hydrolyzed polybutene(1100 M.W.)-$P_2S_5$ reaction product designated as "TMP Ester HC-$P_2S_5$" were employed as comparative ashless dispersants.

The viscosity of the dispersions is related to their sprayability. Although no clear-cut upper limit can be stated unequivocally, because of the wide variability in spraying equipment and conditions, a Brookfield value much in excess of 2000 cps. at 77° F. may cause difficulties.

Tables IIA and IIB below represent the pesticide compositions of the invention (i.e. Runs 1–12) Tables IIC and IID represent comparative compositions. A comparison of the viscosity and storage stability results of Tables IIA and IIB with Tables IIC and IID demonstrates the criticality of the limits of the invention as defined.

TABLE IIA

| | Run Number | | | | | |
|---|---|---|---|---|---|---|
| | 1 | 2 | 3 | 4 | 5 | 6 |
| Blending procedure for base oil | XX | XX | XX | YY | YY | YY |
| Base oil composition (weight percent): | | | | | | |
| Oil A | 49.15 | 48.2 | 49.35 | 49.15 | 49.25 | 49.0 |
| Oil B | 49.15 | 48.2 | 49.35 | 49.15 | 49.25 | 49.0 |
| ALEOP | 0.50 | 0.5 | | 0.50 | | |
| Al octanoate | | | | 0.50 | | 0.5 |
| ALELP | | | | | | 0.5 |
| Succinic-piperazine product | | | | 0.80 | | |
| Propoxylated HC-$P_2S_5$ | | | 3.1 | | | |
| Ethoxylated HC-$P_2H_5$ | | | | | 1.2 | 1.0 | 1.5 |
| Acrylic polymer | 1.2 | | | | | |
| 50 wt. percent base oil—50 wt. percent Sevin dispersion; viscosity at 77° F. (Brookfield) cp | 2,000 | 400 | 480 | 460 | 560 | 1,360 |
| Ambient storage properties of dispersion; days to form dense sediment | +123 | +184 | +154 | +138 | +145 | 113 |

NOTE.—(+) = No dense sediment formed during the days signified.

TABLE IIB

| | Run Number | | | | | |
|---|---|---|---|---|---|---|
| | 7 | 8 | 9 | 10 | 11 | 12 |
| Blending procedure for base oil | YY | YY | YY | XX | XX | XX |
| Base oil composition (weight percent): | | | | | | |
| Oil A | 49.15 | 49.15 | 49.57 | 49.45 | 49.35 | 49.6 |
| Oil B | 49.15 | 49.15 | 49.58 | 49.45 | 49.35 | 49.6 |
| Ethoxylated HC-$P_2S_5$ | 1.2 | 1.2 | 0.6 | 0.5 | 0.7 | 0.3 |
| FeEOP | 0.5 | | | | | |
| CaEOP | | 0.5 | | | | |
| NaEOP | | | 0.25 | | | |
| Ni octanoate | | | | 0.6 | | |
| n-Butylamine-EOP | | | | | 0.6 | |
| Primine[1] 81R–EOP | | | | | | 0.5 |
| 50 wt. percent base oil—50 wt. percent Sevin dispersion; viscosity at 77° F. (Brookfield) cp | 900 | 280 | 160 | 300 | 130 | 920 |
| Ambient storage properties of dispersion; days to form dense sediment | +80 | +80 | +40 | +40 | +40 | +40 |

[1] Primene 81% is a tradename product of the Rohm & Haas Company representing a mixture of $t\text{-}C_2H_{25}NH_2$ $t\text{-}C_3H_{27}\text{-}NH_2$, $t\text{-}C_4H_{29}NH_2$ and $t\text{-}C_{15}H_{31}NH_2$.

NOTE.—(+) = No dense sediment formed during the days signified.

TABLE IIC

| Blending procedure for base oil | Run Number | | | | |
|---|---|---|---|---|---|
| | 13 | 14 | 15 | 16 | 17 |
| Blending procedure for base oil | XX | XX | XX | XX | YY |
| Base oil composition, (weight percent): | | | | | |
| Oil A | 49.75 | 49.4 | | | 49.37 |
| Oil B | 49.75 | 49.4 | 99.25 | 99.375 | 49.38 |
| ALEOP | 0.5 | | | | |
| Al oleate | | | | 0.25 | |
| Al palmitate | | | | | 0.125 |
| Al stearate | | | | | 0.5 |
| Ethoxylated HC-$P_2S_5$ | | 1.2 | 0.50 | 0.5 | 0.75 |
| 50 wt. percent base oil—50 wt. percent Sevin; viscosity (Brookfield) at 77° F., cps | 120,000 | 40 | V. fluid | Viscous | 130 |
| Ambient storage 50/50 properties of composition days to form dense sediment | +41 | 1 | 1 | 6 | 4 |

TABLE IID

| | Run Number | | | | |
|---|---|---|---|---|---|
| | 18 | 19 | 20 | 21 | 22 |
| Blending procedure for base oil | XX | YY | XX | XX | XX |
| Base composition (weight percent): | | | | | |
| Oil A | | 49.37 | 49.55 | 49.15 | 48.75 |
| Oil B | 97.75 | 49.38 | 49.55 | 49.15 | 48.75 |
| ALEOP | | | 0.5 | | 0.50 |
| Al stearate | 1.25 | | | | |
| Cu naphthenate | | | | 0.8 | |
| $NH_4EOP$ | | | | 0.5 | |
| Lecithin | | 1.0 | | | |
| Pentamine product | | | 0.75 | | |
| Ethoxylated HC-$P_2S_5$ | | | | 0.1 | 1.2 |
| TMP ester HC-$P_2S_5$ | | | | | 23 |
| 50 wt. percent base oil—50 wt. percent Sevin; viscosity (Brookfield) at 77° F | Viscous | 520 | Solid | 110 | |
| Ambient storage properties of 50/50 composition; days to form dense sediment | 30 | 10 | 23 | 20 | 13 |

EXAMPLE III

This example illustrates the advantages of employment of supplementary suspending agents in the dispersions of the invention.

Oils A and B and Ethox. Hydrolyzed HC-$P_2S_5$ are described in Example I. The supplementary suspending agent employed was a pyrogenic silica of a particle size less than 400 A. The pesticide employed was Sevin with a particle size of less than 200 mesh (U.S. Standard). The blending procedure utilized was that of Example I except the silica was introduced with the pesticide.

The tests compositions were subject to a severe vibration test consisting of place samples of the dispersion in an 8 oz. bottle and placing the bottle in a can which in turn is fastened to a vibrating belt guard of a commercial air conditioning unit. At the end of the test period the amount of sediment formed at the bottom and amount of clear oil at the top of the test sample were observed and measured.

The test data and results are reported below in Table III:

TABLE III

| Run number | A | B |
|---|---|---|
| Base oil composition weight percent: | | |
| Oil A | 48.85 | 48.35 |
| Oil B | 48.85 | 48.35 |
| ALEOP | 0.45 | 0.45 |
| Silica | | 1.00 |
| Ethoxylated HC-$P_2S_5$ | 1.85 | 1.85 |
| Base composition pesticide dispersion: | | |
| Pesticide | Sevin | Sevin |
| Weight percent pesticide solids | 50 | 50 |
| Weight percent base oil composition | 50 | 50 |
| Viscosity at 77° F. (Brookfield) cps | 350 | 600 |
| Ambient storage properties; days to form dense sediment | +235 | +235 |
| After 3 days of vibration test on dispersion: | | |
| Oil separation on top | 1″ | ½″ |
| Sediment | Heavy | Light |

EXAMPLE IV

This example further illustrates the dispersions of the invention.

The overall procedure of Example I was employed to prepare a composition consisting of 42.8 wt. percent $Cu(OH)_2$ solids of a particle size less than 200 mesh (U.S. Standard) and a base oil composition comprising 95.5 wt. percent Oil A, 0.5 wt. percent ALEOP, 4 wt. percent Ethox. HC-$P_2S_5$. The dispersion was fluid and even after 235 days of storage no dense sediment had formed therein.

EXAMPLE V

The previously mentioned desirability of using oils with a high unsulfonatable residue, from the standpoint of the viscosity of dispersions made therefrom, is illustrated by the subsequent Table IV. ALEOP, Ethoxylated HC-$P_2S_5$ and Sevin have been heretofore defined in Example I. The test data and results are reported below in Table IV:

TABLE IV

| Ingredients (weight percent) | Composition | |
|---|---|---|
| | CC | DD |
| Oil B [1] | 48.0 | |
| Oil C [2] | | 48.0 |
| ALEOP | 0.5 | 0.5 |
| Ethoxylated HC-$P_2S_5$ | 1.5 | 1.5 |
| Sevin | 50.0 | 50.0 |
| Test; viscosity (Brookfield) at 77° F., cps | 8,400 | >20,000 |

[1] Paraffinic oil having an unsulfonatable residue of 96.6 wt. percent, a viscosity (Kin.) at 100° F.=15 cs.
[2] Naphthenic oil having an unsulfonatable residue of 75 wt percent, a viscosity (Kin.) at 100° F.=14 cs.

Although the two oils from which these dispersions were made had essentially the same viscosity at 100° F., they differed significantly in their unsulfonatable residues. It will be noted that Oil B representative of the oils of this invention gave a much lower viscosity dispersion than comparative Oil C.

I claim:

1. A pesticidal dispersion consisting essentially of a paraffinic hydrocarbon oil of a kinematic viscosity at 100° F. of between about 1.5 and 70 cs. and an unsulfonatable content of at least 90 wt. percent, containing between about 0.04 and 3.5 wt. percent of an oil-soluble ashless dispersant, between about 0.04 and 1.4 wt. percent of an oil-soluble sediment resisting salt and between about 30 and 60 wt. percent of a solid, oil insoluble pesticide of a particle size passing a 200 mesh screen, said salt being of the formula $M(Z)_y$ where M is a first member selected from the group consisting of an ion of aluminum, nickel, iron, alkali metal, alkaline earth metal, and alkyl ammonium of from 3 to 20 carbons, y is an integer representing the valence of said first member, Z is a monovalent radical of the formula:

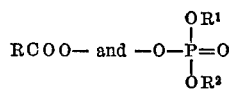

where R is alkyl of from 5 to 12 carbons, $R^1$ is alkyl of from 1 to 3 carbons and $R^2$ is a second member selected from the group consisting of alkyl and alkenyl of from 10 to 22 carbons, said dispersant being selected from the group consisting of (a) an alkoxylated derivative of an inorganic phosphorus acid free, steam hydrolyzed polyalkene (250–50,000 M.W.)-$P_2S_5$ reaction product wherein the alkoxy group contains from 2 to 10 carbons, the mole ratio of alkoxy group to reaction product group is about 1:1, (b) a copolymer of N-vinyl-2-pyrrolidinone and alkyl methacrylate of a molecular weight between about 100,000 and 2,000,000 consisting of between about 4 and 15 wt. percent N-vinyl-2-pyrrolidinone and between about 85 and 96 wt. percent of alkyl methacrylate, said alkyl containing from 4 to 18 carbons, (c) and a condensation product of trialkoxylated N-aminoalkyl piperazine and alkenyl succinic anhydride of a molecular weight between about 2000 and 5000 wherein said alkoxy is from 2 to 10 carbons, said alkyl is from 1 to 5 carbons and said alkenyl is of from 50 to 200 carbons derived from an alkene of from 2 to 10 carbons.

2. A pesticidal dispersion in accordance with claim 1 wherein said pesticide is selected from the group consisting of 1-naphthyl-N-methylcarbamate and cupric hydroxide.

3. A dispersion in accordance with claim 1 wherein said salt is aluminum tri(ethyloleyl orthophosphate) and said pesticide is 1-naphthyl-N-methylcarbamate.

4. A dispersion in accordance with claim 3 wherein said dispersion is the ethoxylated derivative of inorganic phosphorus acid free, steam hydrolyzed polybutene(1100 M.W.)-$P_2S_5$ reaction product.

5. A dispersion in accordance with claim 3 wherein said dispersant is the propoxylated derivative of inorganic acid free, steam hydrolyzed polybutene(1100 M.W.)-$P_2S_5$ reaction product.

6. A dispersion in accordance with claim 3 wherein said ashless dispersant is the condensation product of polybutene(1100 M.W.) succinic anhydride and tripropoxylated 2-aminoethyl piperazine wherein the acyl and hydroxyl groups are present in said condensation product in a ratio of about 1:1.

7. A dispersion in accordance with claim 1 wherein said dispersant is the ethoxylated derivative of inorganic phosphorus acid free, steam hydrolyzed polybutene(1100 M.W.)-$P_2S_5$ reaction product and said pesticide is 1-naphthyl-N-methylcarbamate.

8. A dispersion in accordance with claim 7 wherein said salt is aluminum trioctanoate.

9. A dispersion in accordance with claim 7 wherein said salt is ferric tri(ethyloleyl orthophosphate).

10. A dispersion in accordance with claim 7 wherein said salt is sodium ethyloleyl orthophosphate.

11. A dispersion in accordance with claim 7 wherein said salt is nickel dioctanoate.

12. A dispersion in accordance with claim 7 wherein said salt is calcium di(ethyloleyl orthophosphate).

13. A dispersion in accordance with claim 7 wherein said salt is n-butylammonium ethyloleyl orthophosphate.

14. A dispersion in accordance with claim 7 wherein said salt is a mixture of t-$C_{12}H_{25}NH_3^+$, t-$C_{13}H_{27}NH_2^+$, t-$C_{14}H_{29}NH_3^+$, and t-$C_{15}H_{31}NH_3^+$ ethyloleyl orthophosphates.

15. A dispersion in accordance with claim 1 wherein said salt is aluminum tri(ethyloleyl-o-phosphate), said dispersant is the ethoxylated derivative of inorganic acid free, steam hydrolyzed polybutene(1100 M.W.)-$P_2S_5$ reaction product and said pesticide is cupric hydroxide.

References Cited

UNITED STATES PATENTS

| | | |
|---|---|---|
| 2,329,707 | 9/1943 | Farrington et al. __ 260—448 X |
| 2,346,155 | 4/1944 | Denison et al. __ 260—448 UX |
| 2,359,946 | 10/1944 | Sudholz et al. _____ 252—35 X |
| 3,087,956 | 4/1963 | Locoste et al. _____ 260—978 X |
| 3,171,779 | 3/1965 | McCoy et al. _____ 424—81 X |
| Re. 25,797 | 6/1965 | Mirvise et al. _____ 260—448 X |
| 3,424,684 | 1/1969 | Hellmuth _____ 260—268 X |
| 3,544,629 | 12/1970 | McCoy _____ 424—78 |

FOREIGN PATENTS 1,112,224  8/1940  Australia.

OTHER REFERENCES

Zimmerman et al., Handbook of Material Trade Names Supplement I, 1956, p. 193.

Gregory, Uses and Applications of Chemicals and Related Materials; vol. I, 1939, Reinhold Pub. Co., pp. 36, 59, 140.

Gregory, Uses and Applications of Chemicals and Related Materials; Vol. II, 1944, Reinhold Pub. Co., p. 65.

ALBERT T. MEYERS, Primary Examiner

V. D. TURNER, Assistant Examiner

U.S. Cl. X.R.
424—80, 81, 141, 300